E. C. ANDERSON.
BUNDLE POSITIONING AND DISCHARGE MECHANISM FOR HARVESTERS.
APPLICATION FILED JULY 26, 1918.
1,363,549.
Patented Dec. 28, 1920.
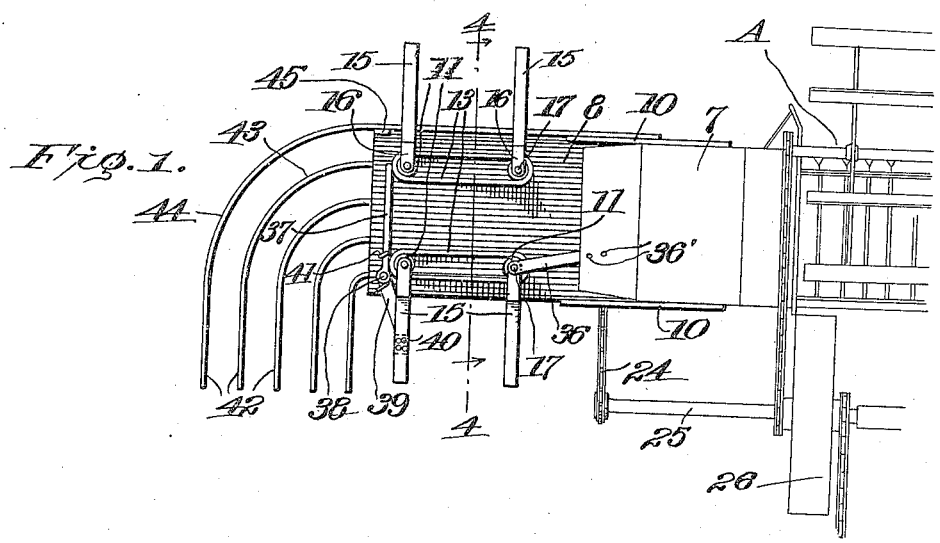

UNITED STATES PATENT OFFICE.

EDWIN C. ANDERSON, OF WAUSA, NEBRASKA.

BUNDLE POSITIONING AND DISCHARGE MECHANISM FOR HARVESTERS.

1,363,549.  Specification of Letters Patent.  Patented Dec. 28, 1920.

Application filed July 26, 1918. Serial No. 246,855.

*To all whom it may concern:*

Be it known that I, EDWIN C. ANDERSON, a citizen of the United States, residing at Wausa, in the county of Knox and State of Nebraska, have invented certain new and useful Improvements in a Bundle Positioning and Discharge Mechanism for Harvesters, of which the following is a specification.

My invention relates to grain bundle delivery mechanism for self-binding harvesters.

Among the important objects, I aim to provide a means against which the bundles are discharged while in a horizontal position to fulcrum thereon and assume a vertical position; means to convey the vertically disposed bundles from the machine, and a means to maintain the bundles in a vertical position after leaving the conveyer means and substantially until deposit upon the ground.

The invention also aims to provide the particular construction hereinafter described and illustrated in accompanying drawings. Servient objects will appear as the said description progresses.

In the said drawings wherein one preferred embodiment is shown and like reference characters designate like or similar parts, Figure 1 is a top or plan view shown in connection with part of a self-binding harvester;

Fig. 2 is a side elevation of the part of Fig. 1;

Fig. 3 is an end elevation of the improvement;

Fig. 4 is a cross sectional view on the line 4—4 of Fig. 1;

Fig. 5 is a fragmentary view of the bottom of the platform showing the gearing means employed for driving the apparatus; and Fig. 6 is a fragmentary cross sectional view through the platform of a modified form.

Referring specifically to the drawings, a self-binding harvester has been fragmentarily shown at A to simplify an understanding of my improvements.

The improvements coöperate with the binder deck at 7 and occupy the position usually occupied by the bundle carrier.

In carrying out my improvements, a platform 8, of metal, wood or any suitable material, is utilized, being fastened to the harvester in any suitable manner, and for instance resting upon beams 9 thereof and having brace bars 10 extending therefrom to the deck 7 as shown. Suitably journaled to the platform, are vertical rollers 11, as by means of trunnions 12 extending through and below the platform. Vertically disposed belts or conveyers 13 are trained around the rollers 11 so as to have the facing portions as shown in Fig. 1, always parallel. Suitable bearings or brackets are provided having transverse bars 14 secured to the under surface of the platform 8, upwardly and inwardly extending struts 15, and inwardly extending horizontal plates 16 through and in which, the upper trunnions 17 of the rollers 11, are journaled.

The rollers and conveyers are adapted to be driven in any suitable manner. For instance, the two innermost rollers, may have beveled gear wheels keyed to their trunnions 12, at 18 and 19. Meshing with the beveled gear wheel 18 is a beveled gear wheel 20 keyed to a shaft 21 mounted in bearings 22, from the platform 8. On this shaft 21, a sprocket wheel 23 is provided over which a sprocket chain 24 passes, which may be driven from the axle 25 of one of the wheels of the harvester, 26. A beveled gear wheel 27 is also keyed to shaft 21, meshing with a beveled gear wheel 28 carried by a shaft 29 mounted by bearings 30 from and transversely of platform 8. Another beveled gear wheel 31 is keyed to shaft 29 and it meshes with a beveled gear wheel 32 keyed to a shaft 33 mounted by bearings 34 from the under-surface of the platform 8. A beveled gear wheel 35 is also keyed to shaft 33 and meshes with the beveled gear wheel 19. The shaft 29 and gear wheels 28 and 31, thus serve the function of an intermediate gear to rotate the shafts 21 and 33 in opposite directions so that the rollers 11 will move the portion of the conveyers 13, where they face each other, in the same direction. In order that the bundles be properly engaged and conveyed by the belts 13, they should be vertically rather than horizontally disposed. Thus as they fall from the deck 7 in a horizontal position, they engage a bar 36 through which one trunnion 17 extends and which is fastened to the deck 7 as by rivets or bolts at 36'. It will be noted that the bar 36 is inclined upwardly and inwardly toward the horizontal median line. Thus as the bundles fall from the deck, their heads will engage the bar 36, so as to fulcrum thereon and cause the bundles to assume a vertical position, resting on the platform 7 and engaged by the conveyers 13.

As the conveyers are turned, they move the bundles toward the outer or discharge end of the platform. At this end, a retainer bar 37 is disposed to swing in a horizontal plane. This bar is pivoted as by means of a bolt 38 to an arm 39 riveted or otherwise fastened at 40, to one of the struts 15. Surrounding the bolt 38 is a coil return spring 41 having one end bearing against the arm 39 and the other end bearing against the retainer arm 37. The spring 41 is tensioned to move toward the conveyers and thus engage the bundle as it is delivered by the conveyer. As successive bundles are moved forward by the conveyer, they engage the retainer arm 37, forcing it outwardly against the tension of the spring until they are deposited upon the ground or desired location in the field. The retainer bar, it will be noticed, prevents the bundles from moving out of the vertical or substantially vertical position, in order that when deposited on the ground, they will be in an upstanding or vertical position for more ready handling.

As the bundles leave the platform 8, they first rest on supporting rods 42, of any desired shape, fastened to the platform. Preferably, however, they are curved as at 43 in order that the bundles may travel in a path for discharge, parallel to the path of travel of the machine. Also, barrier rods 44 substantially similar in shape to the rods 42 may be provided, being fastened to an upstanding bar 45, rising from the platform 8, and to one of the brace bars 10, as at 46, as shown in Fig. 2. The outer ends of the rods 42, terminate relatively close to the ground.

A modified form is shown in Fig. 6, which I desire to employ in some instances. In this form, platform 8 is formed to provide grooves to receive wooden bearing bars 50 for the trunnions 12 of rollers 11. Also a reinforcing angle bar 51 may be secured around the marginal edge of the platform 8.

In operation, as the bundles leave the deck 7 in a horizontal position, their heads engage the bar 36, thus causing the bundles to fulcrum thereon and assume a vertical position, resting on the platform 8 and being grasped by the conveyers 13, which traveling in the same direction, move the bundles to the discharge end of the platform and against the retainer bar 37. The successive bundles force the retainer bar outwardly against the tension of its springs 41 and fall onto the rods 42, guided by the barriers 44. Successive bundles move the bar or rod 37 completely out of the path of the bundles, so that they may slide onto the ground while in a vertical position, and remain in that position. It will be understood, that the bundles while vertical, can be more readily handled then when in a horizontal position. As the bundles are discharged, the spring 41 will restore the retainer bar 37 toward its normal position and into contact with the succeeding bundles.

Since merely one preferred embodiment of the invention has been illustrated and described, it is to be understood that changes in the details of construction may be resorted to without departing from its spirit and scope.

I claim:

A bundle discharging mechanism having a platform, rollers, trunnions on said rollers extending through and beyond said platform, gearing means associated with said trunnions to drive the rollers, endless conveyers trained around the rollers, brackets having bars through which said trunnions pass, struts extending upwardly from said bars, plates extending inwardly from the struts, trunnions at the upper ends of said rollers extending through the plates, an arm secured to one of the struts, a retainer arm pivoted to said arm, a spring associated with the retainer arm and its mounting arm, a bar to receive and position bundles, one of said trunnions extending through said bar, supporting rods leading from the platform and extending rearwardly, and barrier rods associated with the platform.

In testimony whereof I have affixed my signature in the presence of two witnesses.

EDWIN C. ANDERSON.

Witnesses:
CHARLES J. ANDERSON,
C. E. LUNDGREN.